United States Patent [19]

Matrone et al.

[11] 3,925,043
[45] Dec. 9, 1975

[54] LOW COST, EFFICIENT, GENERAL PURPOSE AIR CLEANER CARTRIDGE

[75] Inventors: John L. Matrone, Schenectady; William E. Lyons, Guilderland, both of N.Y.

[73] Assignee: Environment/One Corporation, Schenectady, N.Y.

[22] Filed: Nov. 13, 1973

[21] Appl. No.: 415,360

[52] U.S. Cl. .................. 55/276; 55/316; 55/473; 55/487; 55/497; 55/509
[51] Int. Cl.² ........................................ B01D 50/00
[58] Field of Search ...... 55/276, 316, DIG. 29, 322, 55/323, 387, 467–473, 485–487, 497, 499, 500, 502, 507, 509; 98/115, 115 LH; 248/13

[56] References Cited
UNITED STATES PATENTS

| | | | |
|---|---|---|---|
| 2,138,874 | 12/1938 | Myers | 55/527 |
| 2,671,528 | 3/1954 | Gross | 55/316 |
| 2,771,155 | 11/1956 | Palmore | 55/509 |
| 3,176,447 | 4/1965 | Omohundro et al. | 55/DIG. 29 |
| 3,250,063 | 5/1966 | Andrews | 55/483 |
| 3,273,321 | 9/1966 | Bauder et al. | 55/499 |
| 3,375,640 | 4/1968 | Pelosi, Jr. | 55/473 |
| 3,494,113 | 2/1970 | Kinney | 55/497 |
| 3,537,381 | 11/1970 | Austin | 55/DIG. 29 |
| 3,760,568 | 9/1973 | Neumann et al. | 55/473 |
| 3,774,522 | 11/1973 | Marsh | 98/33 R |
| 3,791,113 | 2/1974 | Elder | 55/473 |
| 3,797,961 | 3/1974 | Brechbahl | 415/219 C |
| 3,812,370 | 5/1974 | La Violette | 55/483 |
| 3,828,530 | 8/1974 | Peters | 55/DIG. 29 |

FOREIGN PATENTS OR APPLICATIONS
1,225,751   3/1971   United Kingdom .................. 55/316

OTHER PUBLICATIONS

Dexon Prime-Aire Dexon Inc., Minneapolis, Minn., dtd., 1/17/73, pp. 1–4.

*Primary Examiner*—Bernard Nozick
*Attorney, Agent, or Firm*—Charles W. Helzer

[57] ABSTRACT

A compact, self-contained, low cost, efficient room air cleaner cartridge is provided for cleaning the room air of homes, offices and the like. The room air cleaner cartridge is a general purpose cartridge that may be mounted separately in a variety of different cabinets or housings as well as in the ceiling of a room, the ducting of a home furnace, or be used as a supply of clean air to a canopy tent such as that used in an oxygen tent for patients in a hospital or nursing home who suffer from allergies or the like. Because the general purpose room air cleaner cartridge is a completely self supported, self-contained and operating room air cleaner, it is not necessary for users of the cartridge to provide air tight seals between it and the cabinet housing, ceiling ducting, etc., where it is desired to use the cartridge.

15 Claims, 11 Drawing Figures

LOW COST, EFFICIENT, GENERAL PURPOSE AIR CLEANER CARTRIDGE

BACKGROUND OF INVENTION

1. Field of Invention

This invention relates to a novel, general purpose room air cleaner cartridge which constitutes a complete and operable room air cleaner and which can be mounted readily and inexpensively in a variety of different cabinet designs as well as in different arrangements to provide improved air cleaning for a room or other enclosure.

2. Background Prior Art

U.S. Pat. No. 3,812,370, issued May 21, 1974, Fred G. La Violette, Inventor - entitled: "Improved Low Cost Portable Room Air Cleaner" — Assigned to the Environment/One Corporation, the assignee of the present invention, describes and claims an improved portable room air cleaner for cleaning room air of offices, homes, hospitals, and the like, of substantially 90 percent of all small particles normally contained in the air down to a particle size range of 0.005 microns in diameter. This portable room air cleaner has been favorably received and utilized successfully by a large number of individuals and organizations, and for a wide number of purposes, particularly persons who suffer or tend to suffer from allergies. While the portable room air cleaner has been used successfully in a wide number of applications, still there are many uses to which it could be put except for its design for use as a piece of room furniture. In order to overcome this shortcoming, the present invention was devised.

SUMMARY OF INVENTION

It is, therefore, a primary object of the present invention to provide a novel, general purpose room air cleaner cartridge which is completely self-supported, self-contained and sealed from the atmosphere and is capable of operating as a room air cleaner unit without further modification or addition.

The general purpose air cleaner cartridge can be mounted in a wide variety of different types of cabinet housings of different decor readily and inexpensively by relatively unskilled assembly personnel, and without requiring the use of air tight seals between the general purpose air cleaner cartridge and the cabinet in which it is mounted since the cartridge is a completely self-contained and functioning air cleaner unit.

Further, the general purpose air cleaner cartridge can be mounted in the ceiling of a room, in the furnace ducting of a home, as the air supply unit of a canopy or tent covering patients in hospitals or nursing homes who suffer from various allergies or in a wide number of different applications where its low cost and efficient air cleaning make it adaptable for use.

In practicing the invention, a compact, self-contained, low cost, efficient room air cleaner cartridge is provided for cleaning the room air of homes, offices and the like. The room air cleaner cartridge comprises housing support means formed by a base member and a plurality of elongated supporting side members secured to and extending from the base member. A high volume air fan is supported on the base member and a relatively high velocity air discharge conduit is formed on the housing support means and supported by the elongated supporting side members. The high volume fan is disposed on the base member with its outlet discharging into the relatively high velocity air discharge conduit. The outlet between the high volume fan and the intake to the high velocity air discharge conduit is sealed shut for preventing leakage of air therebetween. An inlet is connected to the intake of the high volume fan to provide a suction inlet air passageway to the intake of the high volume fan and a coarse large particle prefilter is disposed in the inlet air passageway. A relatively low cost, small particle filter is provided together with mounting means for mounting the small particle filter on the ends of the elongated supporting side members transversely across at least part of one side of the high velocity air discharge conduit. Means are provided for sealing the fine small particle filter over at least part of one side of the high velocity air discharge conduit so as to prevent leakage of air between the conduit and the fine small particle filter thereby forcing air discharged from the high volume fan to pass through the air discharge conduit and thence out through the fine small particle filter to form a completely self-contained and operating air cleaner.

The room air cleaner cartridge thus comprised can be mounted in an exterior cabinet of attractive appearance having air inlet and air outlet openings, and with the air cleaner cartridge secured within the exterior cabinet in a manner such that the air inlet and air outlet openings of the cabinet are aligned with the inlet air passageway and the diffuse clean air discharge side of the small particle filter, respectively, without requiring the use air tight seals or the like between the exterior cabinet and the air cleaner cartridge.

A further feature of the room air cleaner cartridge design is the provision of a mechanical shock and vibration absorption means in the form of a sponge rubber pad secured to the base member of the air cleaner cartridge. In order to reduce vibration noises to a minimum, the high velocity air discharge conduit means preferably is formed of a tightly woven cloth panel such as canvas extending between the discharge outlet of the high volume fan and the mounting means for the small particle filter, and supported by the elongated supporting side members.

The relatively low cost, fine small particle filter preferably comprises a readily replaceable small particle filter assembly including an outer support member that defines the intake area of the fine small particle filter. The outer support member is mounted on the elongated supporting arms of the air cleaner cartridge housing over the open end of the high velocity air discharge conduit. Fine small particle filter media shaped in the form of a multiplicity of adjacent wedge-shaped spaces secured together on a support member with the spaces extending out in the direction of airflow. Coarse supporting means are provided and impose little or no pressure drop and are secured to and confine the configuration of a substantial portion of the respective wedge shaped space whereby the sides of adjacent spaces do not blow out to an extent sufficient to contact one another in a manner that otherwise would result in restriction of air flow through any of the spaces and a substantially even pressure gradient is maintained across all the sides of all of the spaces to assure maximum utilization of the filtering surfaces of the fine small particle filter media and maintenance of a steady, large volume diffuse clean air flow through the air cleaner cartridge.

BRIEF DESCRIPTION OF DRAWINGS

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIG. 11 is a diagramatic sketch of an arrangement wherein the general purpose room air cleaner cartridge is employed to provide clean air to the inside of a canopy or tent such as that employed with oxygen tents or the like.

DETAILED DESCRIPTION OF PREFERRED EMBODIMENTS

Figure 1:
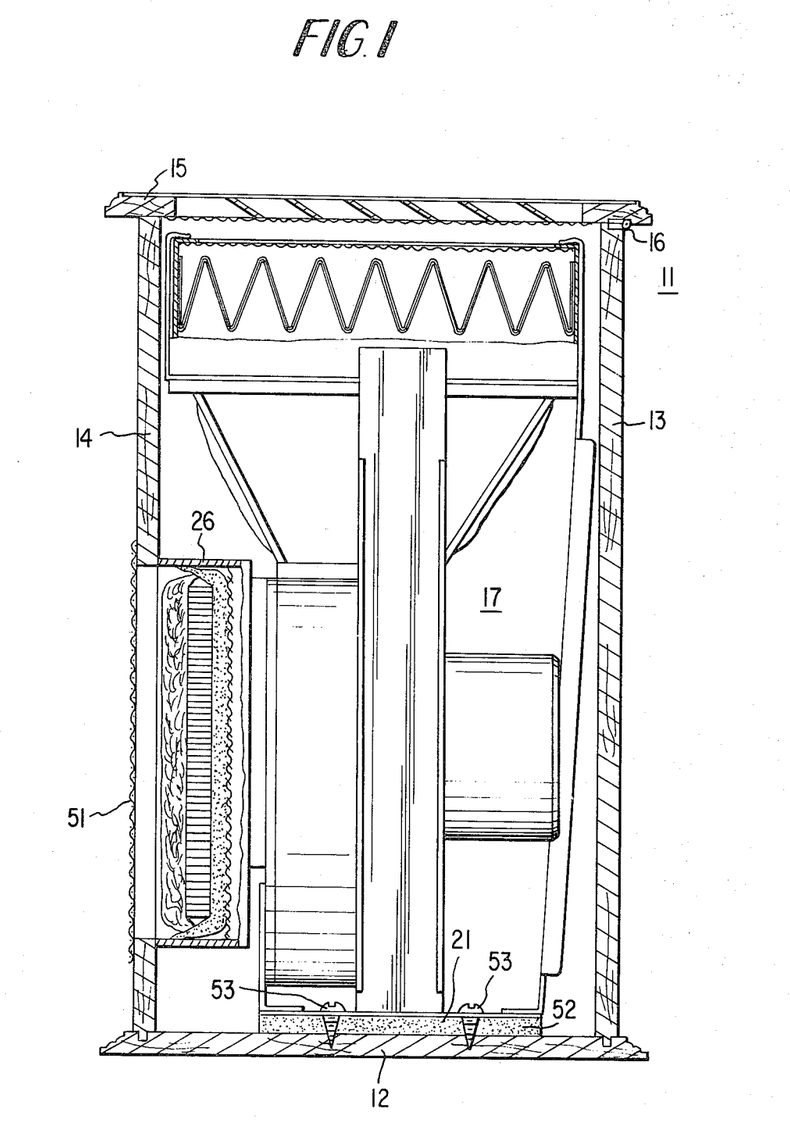
FIG. 1 is a side sectional view of a new and improved, portable, efficient room air cleaner constructed in accordance with the invention and comprises an outer housing having a room air cleaner cartridge constructed in accordance with the invention secured therein.

FIG. 1 is a side sectional view of a compact, portable, efficient room air cleaner constructed in accordance with the present invention. The air cleaner is enclosed within an exterior cabinet (11) of attractive appearance and comprised by a generally rectangular-shaped box-like housing structure having a supporting base (12), front wall (13), and back wall (14) secured together by side walls (not shown in the sectional view of FIG. 1). A louvred top (15) is hinged at (16) for providing ready access to the interior of cabinet (11).

Figure 2:
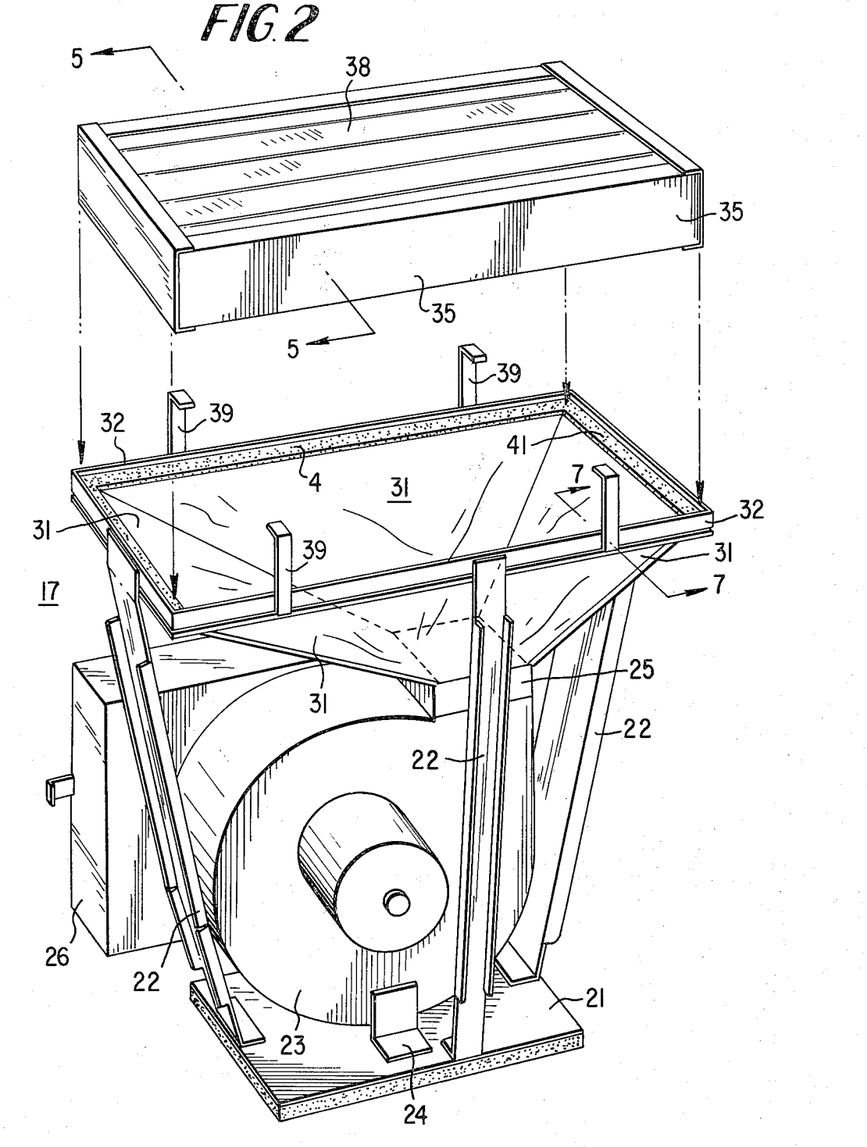
FIG. 2 is partially exploded, top perspective view of a general purpose room air cleaner cartridge constructed in accordance with the invention.

Secured within cabinet (11) is a compact, self-contained, low cost, efficient room air cleaner cartridge (17) which is better illustrated in the partially exploded perspective view shown in FIG. 2. Referring to FIG. 2, the room air cleaner cartridge (17) includes housing support means comprised by a base member (21) and a plurality of elongated supporting side members (22) which are secured to and extend upwardly from the base member (21). The base member may comprise a sheet of relatively thick (1/16 of an inch) sheet steel, cast iron, wood, fiberglass or other suitable material of sufficient mass to provide an adequate base for supporting the room air cleaner cartridge. The upwardly extending elongated supporting side members (22) may comprise U-shaped channel members fabricated from light weight sheet steel and are secured to the base member (21) by spot welding, rivets, nuts or bolts or the like.

Figure 3:
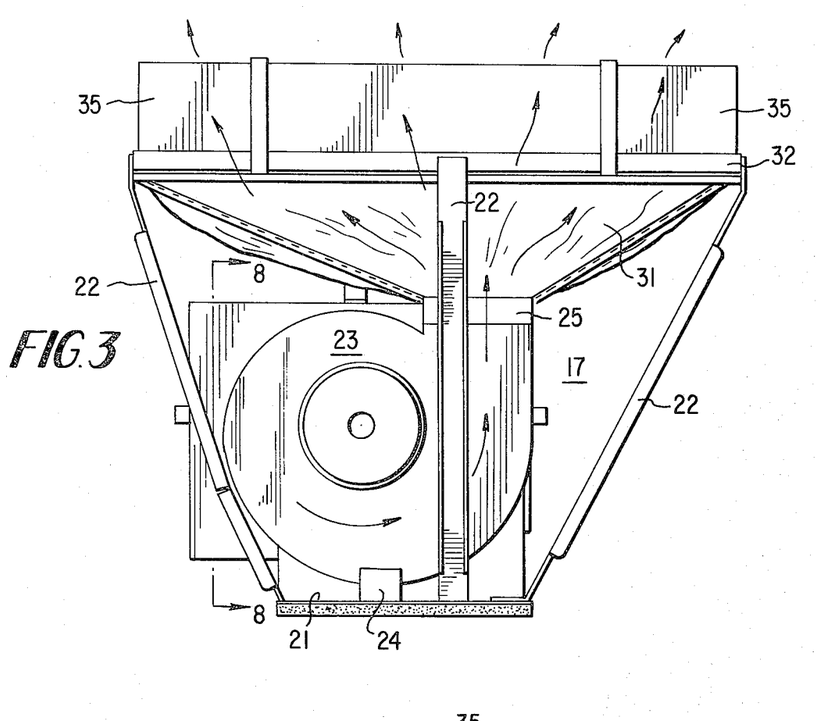
FIG. 3 is a side view of the novel room air cleaner cartridge shown in perspective in FIG. 2.
Figure 4:
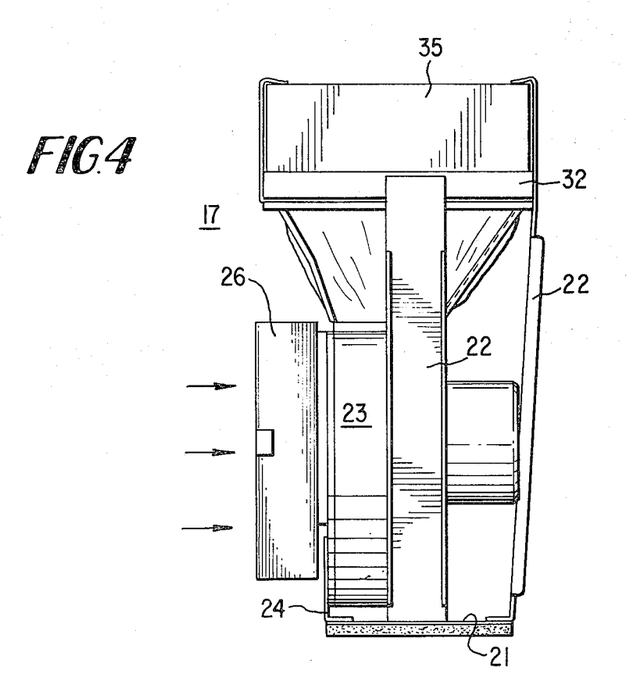
FIG. 4 is an end view of the room air cleaner cartridge shown in FIGS. 2 and 3.

A high volume fan shown at (23) is mounted on the base member (21) by means of L-shaped supports (24) spot welded or otherwise secured to the base member (21) and to the exterior housing of the high volume fan (23). The high volume fan (23) may comprise a conventional, squirrel cage induction motor blower or other similar standard commercially available high volume fan for producing a relatively high volume flow of air at its discharge outlet shown at (25). To produce the desired high volume flow of air, a centrifugal blower driven by a conventional alternating current motor operating from a 110 volt, 15 amp normal residential commercial outlelt is preferred. Such electric motor driven centrifugal blowers are manufactured in quantities for use in vacuum cleaners and the like but are normally employed to provide a suction vacuum for the vacuum cleaner. In the present product, it is anticipated that the blower will be used primarily to provide a high volume flow of air through the air cleaner cartridge. FIGS. 3 and 4 of the drawings are respective front and side views of the air cleaner cartridge and illustrate in better detail the manner in which inlet air is supplied axially to the intake of the blower (23) through a suction inlet air passageway comprised by a coarse prefilter housing (26) secured to blower (23) on the suction air intake side of the blower. As a consequence of this arrangement, inlet air is sucked in axially by the blower vanes and then discharged circumferentially out through the outlet air discharge opening (25) in the manner indicated by the airflow arrows shown in FIGS. 3 and 4, respectively.

Figures 5, 6, 7, 8:
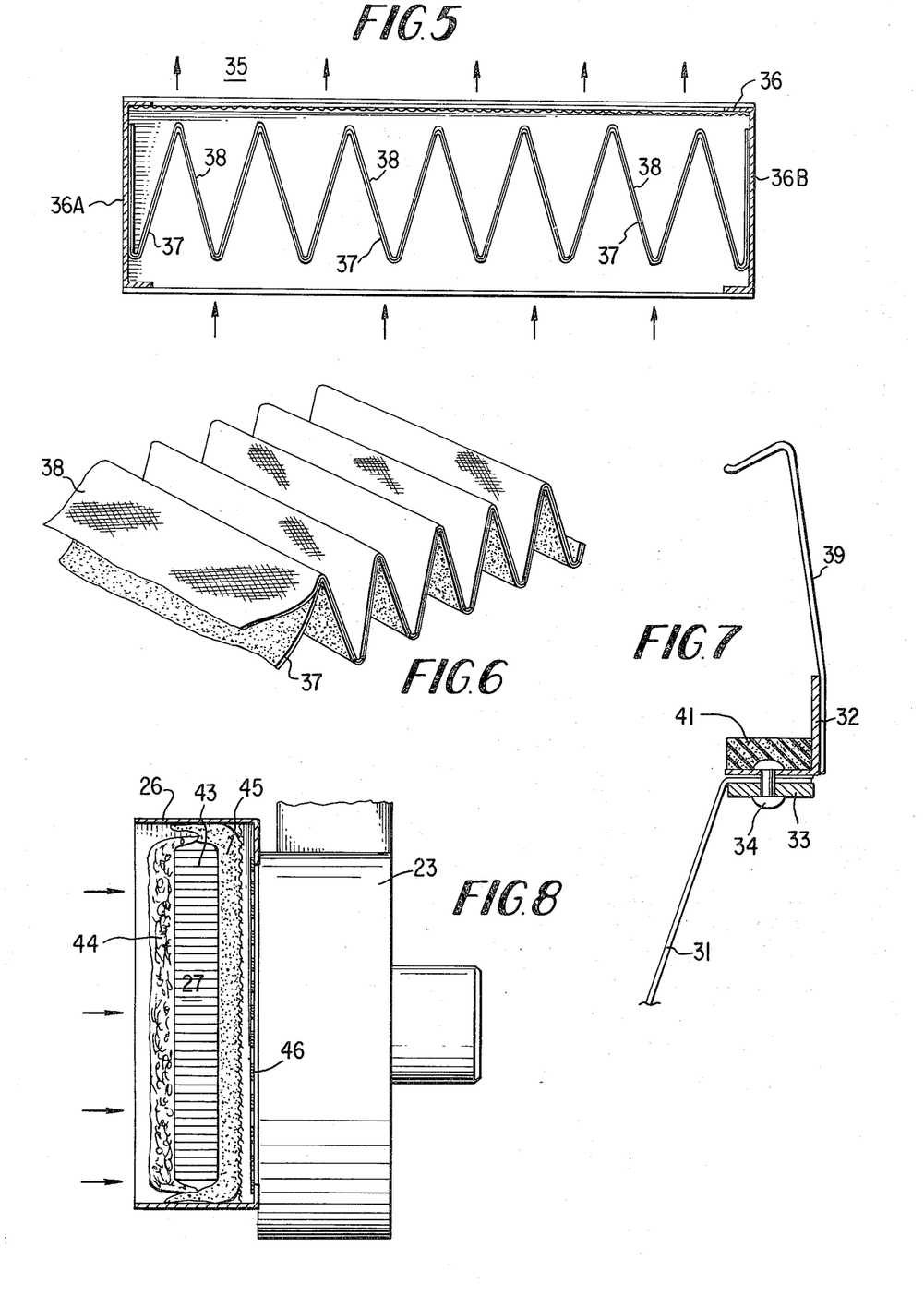
FIG. 5 is a partial sectional view of a small particle filter assembly constructed for use with the room air cleaner cartridge shown in FIGS. 2–4.
FIG. 6 is a partially disassembled view of the small particle filter media and its coarse supporting screen formed in the shape of a multiplicity of wedge-shaped adjacent pockets which are mounted within the filter assembly shown in cross-section in FIG. 5.
FIG. 7 illustrates the construction of the flexible, resilient retaining fingers and ceiling mount that is used in the air cleaner cartridge to mount the small particle filter assembly shown in FIG. 5.
FIG. 8 is a partial sectional view of a preferred construction of a coarse prefilter used in the inlet air passageway to the high volume fan comprising a part of the novel room air cleaner cartridge.

FIG. 8 of the drawings is a partial cross-sectional view of the construction of the suction inlet air passageway to the blower (23) and illustrates in detail the preferred form of construction for a novel, coarse large particle prefilter (27) secured in the inlet air passageway housing (26). The construction of the prefilter (27) will be described in greater detail at a later point in the specification.

Relatively high velocity air discharge conduit means which also serves as a high pressure outlet air plenum, is formed on the housing support means and is supported by the elongated supporting side member (22). This relatively high velocity, air discharge conduit means preferably is comprised by a funnel-shaped member (31) formed from a closely woven cloth such as canvas, dacron or the like and secured between the high volume fan discharge outlet opening (25) and a mounting means comprised by a rectangular-shaped, peripheral inflexible mounting frame or flange (32) secured to and supported by the free ends of the elongated supporting arm members (22). It is preferred that the funnel-shaped conduit means (31) be fabricated from a tightly woven cloth such as canvas for a variety of reasons such as low cost, light weight, ease in assembly but primarily for the reason that it greatly reduces mechanical vibrations and noise generation and transmission due to "oil drum" effect in the rather substantial planar surfaces that comprise the panels forming the funnel-shaped conduit means (31). These panels could, of course, be fabricated from plastic, wood, sheet steel or other similar materials and would work satisfactorily but for the above enumerated reasons, a tightly woven cloth such as canvas, dacron or other similar material, is preferred. The small cross-sectional end of the funnel-shaped discharge conduit (31) is secured to the high volume outlet air discharge opening (25) by a peripheral clamp, by means of a suitable adhesive, an elastic garter supported within a peripheral groove or some other suitable sealing construction for sealing the outlet (25) from the high volume fan to the high velocity air discharge conduit means (31) for preventing the leakage of air at this joint.

For a similar purpose the upper peripheral edge of the funnel-shaped conduit means (31) is sealingly secured to the rectangular mounting frame or flange (32) in the manner best shown in FIG. 7 of the drawings. In FIG. 7, it will be seen that the rectangular mounting flange (32) has an L-shaped cross-sectional configuration and that the upper peripheral edges of the tightly woven cloth conduit (31) are rigidly clamped between a horizontally extending leg of mounting flange (32) and a clamping member (33) by means of rivets (34) and a suitable adhesive. By this construction it is asssured that air leakage will not take place between the upper ends of the tightly woven cloth conduit panels (31) and the mounting flange (32).

From a consideration of FIGS. 2–4, it will be appreciated that the mounting frame or flange (32) serves as a mounting means for a small particle filter (35) that is secured transversely across the discharge opening of the funnel-shaped high velocity discharge air conduit (31). FIG. 5 is a cross-sectional view illustrating the construction of the relatively low cost, fine small particle filter (35). Referring to FIG. 5, it will be seen that the fine small particle filter (35) comprises a readily replaceable small particle filter assembly including a rectangular shaped outer support member (36) of cardboard or some similar material such as plastic, that corresponds in size substantially to the discharge opening from the high velocity air conduit (31) and is designed to be mounted transversely across such opening so as to effect a closure over the high velocity discharge conduit (31) in the manner best depicted in FIGS. 3 and 4 of the drawings. Fine small particle filter media indicated generally at (37) in FIGS. 5 and 6 is shaped in the form of a multiplicity of adjacent wedge-shaped spaces that are secured between the sidewalls (36A) and (36B) of the outer support member (36) and extend substantially across the entire cross-section of the support member transversely to the direction of flow of air through the assembly. Fine fiber filter media such as Owens-Corning "FM-003-¼" which is shaped in for form of adjacent spaces may be used to form the filter media (37). Coarse supporting means (38) preferably in the form of a coarse wire screen is secured to and confines the configuration of a substantial portion of the respective wedge-shaped spaces of fine small particle filter media in a manner such that adjacent spaces are not allowed to blow out to an extent sufficient to contact one another in a manner that otherwise would result in restriction of air flow through any of the spaces, and a substantially even pressure gradient is maintained across all of the sides of all of the spaces to assure maximum utilization of the filtering surfaces of the fine small particle filter media. By constructing the small particle filter assembly in this manner, maintenance of a steady, large volume diffuse air flow throughout the entire cross section of the small particle filter media, is assured. The fine small particle filter media (37) has its end portions secured to the opposite wall portions (36A) and (36B) of the peripheral outer support member (36) by means of a suitable adhesive and/or staples, rivets, or other suitable mechanical fastening devices used in conjunction with or in lieu of the adhesive to firmly secure the small particle filter media and its supporting wire screen to the side walls (36A) and (36B) of the rectangular support member (36).

As best shown in FIGS. 2–4, the fine small particle assembly is removably mounted on the housing support means comprised by the base member (21), and the elongated supporting side members (22) by mounting means which is comprised in part by the peripheral, inflexible mounting flange (32). As best seen in FIGS. 2 and 7, the mounting means further includes a plurality of flexible, resilient retaining fingers (39) which are secured at different points around at least a portion of the periphery of the mounting flange (32) for securing and retaining in place the removable small particle filter assembly (35). Secured to the open, rectangular-shaped peripheral inflexible mounting flange (32) is a gasket (41) of pliable sealing material such as sponge rubber on which the corresponding peripheral surface of the removable small particle filter assembly (35) seats in the manner depicted in FIGS. 3 and 4. With the removable small particle filter assembly (35) seated in this fashion on the sealing gasket (41), the resilient retaining fingers (39) clamp the assembly firmly in place so as to assure that no leakage of air takes place between the mounting flange (32) and the exterior surfaces of walls (36) of filter assembly (35). By this construction, it is assured that substantially all of the air discharged from the high volume blower (23) passes through the small particle filter media (37) and results in filtering out or cleaning from the air substantially all particles entrained therein having a particle size of 0.005 microns or larger, and the provision of a diffuse clean air flow from the upper outlet surface of the small particle filter assembly (35).

With reference again to FIG. 8 of the drawings, it will be seen that the coarse prefilter employed in the suction inlet air passageway to the centrifugal blower (23) preferably is comprised by a composite sandwich structure including a planar odor filter element (43) which may comprise charcoal, activated charcoal or any other type of known, commercially available odor removing filter material. The planar odor filter element (43) is sandwiched between opposite layers of coarse fiber filter media (44) and (45) such as the filter fiber pad material known as "DYNEL" manufactured and sold by Union Carbide Co. and is of the type used conventionally in removing airborne dust particles in air conditioning or air heating ducting systems. It is preferred, however, that the coarse fiber filter media employed in the layer (44) be of a more gross or coarse nature than the filter media employed in the second layer (45) of the sandwich structure. By this arrangement a unitized coarse prefilter sandwich structure is provided having coarse filter media on the inlet side, a grid of charcoal or other odor removing material in the center, and a finer but still relatively coarse media on the exhaust side to trap loose charcoal particles and/or other fine particles which were too small to be filtered out by the coarser layer of filter media (44) on the inlet side of the unitized sandwich structure. The two layers (44 and 45) of filter media are sufficiently larger than the central odor element (43) so that a peripheral edge is provided around the complete circumference. This peripheral edge of the two filter media layers is heat sealed, stapled, or otherwise secured completely around the circumference to provide an envelope for the charcoal or other odor filter elements. This overlapping edge material is proportioned so that it serves to retain the coarse prefilter structure in place within the suction inlet passageway housing (26). In order to assure that the coarse prefilter sandwich structure is not drawn into the suction intake of the blower fan, a piece of coarse screen, hardware cloth or the like (46) is secured over the suction intake opening to the blower fan (23). The coarse screen (46) also serves as a safety screen to prevent persons from reaching through the suction inlet housing (26) and exposing their hands to the blower fan.

From the preceeding description, it will be appreciated that the present invention provides a cartridge-type air cleaner that is a completely self-contained and functioning air cleaner without requiring an outside case or cabinet. As a consequence, the air cleaner cartridge does not require the provision of a seal between it and the cabinet into which it may be inserted. Hence, the air cleaner cartridge can be completely manufactured, tested and proven to be in working order prior to being mounted in an exterior cabinet or other housing. This greatly facilitates manufacturing and marketing of a line of room air cleaners having a wide variety of different exterior cabinet designs as well as other applications.

Referring again to FIG. 1 of the drawings, it will be seen that the room air cleaner cartridge (17) readily may be mounted in an exterior cabinet of attractive appearance for housing the air cleaner cartridge. All that is required is that the exterior cabinet has an air inlet opening such as that shown at (51) aligned with the suction inlet air passageway housing (26) and an air outlet opening such as the louvred top (15) aligned with the discharge opening from the small particle filter assembly (35).

In order to cut down noise due to mechanical vibration, shock and the like, it is preferred that mechanical shock and vibration absorption means in for form of a sponge rubber pad (52), rubber gromets, supporting coil or leaf springs, or the like be secured to the under surface of the base member (21). The air cleaner cartridge (17) then may simply be mounted in the exterior cabinet (11) by means of set screws shown at (53), nuts and bolts, or some other known fastening device for securing the air cleaner cartridge to the base supporting member (12) of outer cabinet (11). Because the air cleaner cartridge is a self-contained and functioning air cleaner in its own right, it would not be necessary to provide seals between the inlet opening and the outlet opening of the exterior cabinet (11) of the air cleaner cartridge. Thus, only unskilled help is required in assembly the air cleaner cartridge within its exterior cabinet housing. If desired, additional sponge rubber gaskets or the like can be secured between the inlet opening (51) periphery and the inlet passageway housing (26).

Figure 9:
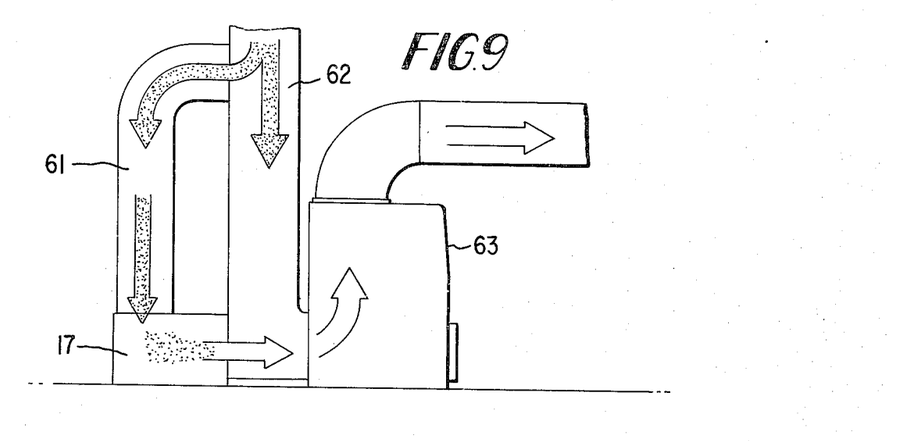
FIG. 9 is a diagrammatic functional sketch showing a different application for the general purpose room air cleaner cartridge wherein the air cleaner cartridge is employed in a bypass path of a home furnace ducting system to provide for air cleaning of at least a part of the air transported through the ducting system.
Figure 10:
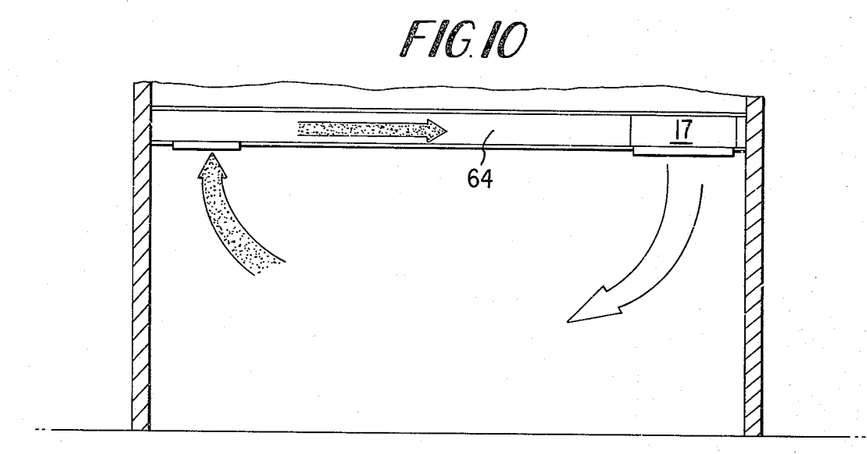
FIG. 10 is a functional schematic diagram of a room air cleaning arrangement wherein one of the general purpose room air cleaner cartridges is mounted in the ceiling of a room between the rafters to provide for cleaning of the room air.
Figure 11:
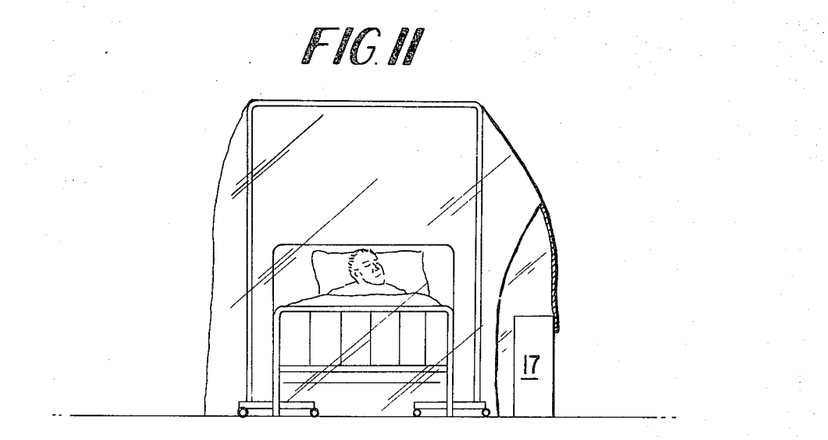

FIGS. 9 through 11 of the drawings illustrate a number of other applications or uses for the air cleaner cartridge (17). In FIG. 9 the air cleaner cartridge (17) is disposed in a bypass conduit line (61) of a ducting system (62) supplying inlet air to a conventional home furnace (63). With this arrangement, the room air cleaner cartridge (17) will draw off and clean a significant portion (roughly about one half) of the air being circulated through the ducting system. Needless to say, in place of the furnace (63) an air conditioner could be used. Assuming that the system is a closed ducting system, then repeated passes through the room air cleaner will result in substantial cleaning of the air being processed through the ducting system.

In the arrangement shown in FIG. 10, the air cleaner cartridge (17) is disposed between the rafters or ceiling joists in the ceiling of a room constructed in the conventional manner wherein the ceiling joists or rafters run across the entire width of the room. With this arrangement, an inlet opening is provided on the far side of the room from the air cleaner cartridge (17) and the air cleaner cartridge discharges downwardly directly into the room. Installation in this manner between the ceiling joists where the ceiling joists become the duct from one side or end of the room to another, would insure complete air movement in the room particularly up near the ceiling where smoke tends to rise and accumulate. Alternatively, the air cleaner cartridge unit could be mounted in a wall for bringing in fresh filtered air from outside the building to eliminate closed-up, oxygen poor air which can occur with closed circulating air heating and air conditioning units. Installation of the air cleaner cartridge unit in walls for this purpose is believed to be abundantly clear and, not to require illustration.

FIG. 11 illustrates an arrangement where the air cleaner cartridge (17) is employed to provide clean, filtered air to the interior of a canopy or tent such as an oxygen tent placed over the bed of an allergy patient in a hospital, nursing home or in his own residence. With such an arrangement, the maintenance of clean air in the ambient atmosphere surrounding an allergy victim can be achieved with minimal cost equipment.

From the foregoing description it will be appreciated that the invention provides a novel, general purpose room air cleaner cartridge which is completely self-contained and functioning air cleaner. Since the air cleaner cartridge is sealed from the atmosphere and is capable of operating as an air cleaner unit without further addition or modification, it readily can be mounted in a wide variety of different types of cabinet housings having different decor without requiring the use of air tight seals or other complex fixtures or fittings. Further, the general purpose air cleaner cartridge readily can be mounted in the ceiling of a room, in the ducting of a furnace heating or air conditioning system of a home or office and can be used as a filtered, pure air supply for a tent or canopy covering allergy victims or patients in hospitals as well as in a multiplicity of other different applications where its low cost and air cleaning efficiency and ease of installation, make it adaptable for use.

Having described one embodiment of a novel, air cleaner cartridge constructed in accordance with the invention, it is believed obvious that other modifications and variations of the invention will be suggested to those skilled in the art in the light of the above teachings. It is, therefore, to be understood that changes may be made in the particular embodiment of the invention described which are within the full intended scope of the invention as defined by the appended claims.

What is claimed is:

1. A compact, self-supported, low cost, non-enclosed fully operated efficient room air cleaner cartridge for cleaning the room air of homes, offices and the like comprising support means formed by a base member having a relatively flat supporting surface and a plurality of spaced-apart elongated supporting side members secured to and extending from said base member, a high volume air fan having a fan housing with an intake and outlet and supported on the base member, relatively high velocity air discharge conduit means supported by said elongated supporting side members, the high volume fan being disposed on the base member with its outlet discharging into one side of said relatively high velocity air discharge conduit means, means sealing the outlet from the high volume fan to the high velocity air discharge conduit means for preventing the leakage of air therebetween, inlet means connected to the intake of the high volume fan to provide a suction inlet air passageway to the intake of the high volume fan, a coarse, large particle prefilter disposed in the inlet air passageway, a relatively low cost, small particle filter including fine particle filter media, a mounting frame having a closed periperiphy defining a central opening connected to the free ends of said supporting side members mounting said small particle filter transversely across another side of the high velocity air discharge conduit means, said small particle filter being coextensive in size with the central opening in said mounting frame, means sealing said high velocity air discharge conduit means around the central opening in said mounting frame, means sealing the fine small particle filter over the central opening in said mounting frame for preventing leakage of air therebetween whereby air blown into the high velocity air discharge conduit means by the high volume fan is forced through the small particle filter and diffusely discharged exterior of the support means and the cartridge forms a completely self-supported, non-enclosed, fully operational room air cleaner.

2. A room air cleaner employing the cartridge according to claim 1 further including an exterior cabinet of attractive appearance for housing the air cleaner cartridge with said exterior cabinet having air inlet and air outlet openings formed therein, and means for securing the air cleaner cartridge within said exterior cabinet with the air inlet and air outlet openings aligned with the inlet air passageway and the diffuse clean air discharge side of the small particle filter, respectively, without requiring the use of air tight seals between the exterior cabinet and the air cleaner cartridge.

3. A room air cleaner cartridge according to claim 1 wherein said relatively high velocity air discharge conduit means also comprises a high pressure air plenum chamber and is formed by tightly woven fabric panels extending between the discharge outlet of the high volume fan and the mounting frame for the small particle filter supported by said elongated supporting side members.

4. A room air cleaner cartridge according to claim 1 further including an odor filter disposed in at least one of said air passageways through the room air filter cartridge for substantially reducing odors in the room air being cleaned.

5. A room air cleaner cartridge according to claim 1 wherein the relatively low cost, fine small particle filter comprises a readily replaceable small particle filter assembly including an outer support member that defines the intake area of the fine small particle filter, said outer support member being mounted on said mounting frame transversely across the high velocity air discharge conduit means outlet fine small particle filter media shaped in the form of a multiplicity of wedge-shaped spaces secured on the support member with the wedge-shaped spaces extending out in the direction of air flow, and coarse supporting means that impose little or no pressure drop secured to and confining the configuration of a substantial portion of the respective wedge-shaped spaces whereby adjacent spaces do not blow out to an extent sufficient to contact one another in a manner that otherwise would result in restriction of air flow through any of the spaces and a substantially even pressure gradient is maintained across all of the sides of all of the spaces to assure maximum utilization of the filtering surfaces of the fine small particle filter media and maintenance of steady, large volume diffuse air flow caused by suction of the room air through the large particle prefilter into the fan and discharge of the fan out through the relatively high velocity air discharge conduit means and the fine small particle filter to result in diffuse circulation and removal of a substantial portion of all particles usually found in room air.

6. A room air cleaner cartridge according to claim 5 wherein the fine small particle filter assembly is removably mounted in the mounting frame secured to the ends of the elongated supporting side members at a location defining the outlet from the relatively high velocity air discharge conduit means, and said means for sealing the small particle filter over the central opening in the mounting frame comprises a filter assembly gasket of a pliable sealing material seated between the mounting frame and the outer support member of the small particle filter assembly, and a plurality of flexible, resilient retaining finger means secured at different points around at least a portion of the periphery of the mounting frame and spaced from the filter assembly gasket a short distance to form a retaining grip for receiving the edges of the outer support member of the small particle filter assembly and for firmly clamping the small particle filter assembly in place over the filter assembly gasket and transversely across the open end of the high velocity air discharge conduit means.

7. A room air cleaner cartridge according to claim 1 further including a coarse wire-supporting structure secured within the inlet air passageway for supporting the coarse fiber large particle prefilter and an odor filter secured between the large particle prefilter and such coarse wire-supporting structure supplying the intake of the high volume fan whereby removal and replacement of the coarse large particle prefilter and odor filter after they have become dirty in service, is facilitated.

8. A room air cleaner cartridge according to claim 7 wherein said coarse fiber large particle prefilter and odor filter are fabricated as a composite unit with the coarse fiber prefilter surrounding the odor filter in a sandwich-like manner and being sealed around its outer peripheral edges to form an integral structure.

9. A room air cleaner cartridge according to claim 8 wherein the composite coarse filter and odor unit is comprised of two different grades of coarse filter fibers with one grade of coarse filter fiber being utilized to form one side of the sandwich-like structure and a different finer grade of coarse filter fiber being utilized to form the opposite remaining side of the unitary sandwich-like structure.

10. A room air cleaner cartridge according to claim 1 further including mechanical shock and vibration absorption means secured to the base member for noise reduction purposes.

11. A room air cleaner cartridge according to claim 3 wherein said relatively high velocity air discharge conduit means also comprises a high pressure air plenum chamber and is formed by tightly woven cloth panels extending between the discharge outlet of the high volume fan and the mounting frame for the small particle filter supported by said elongated supporting side members and the relatively low cost, fine small particle filter comprises a readily replaceable small particle filter assembly including an outer support member that defines the intake area of the fine small particle filter, said outer support member being mounted on said mounting frame transversely across the high velocity air discharge conduit means outlet, fine small particle filter media shaped in the form of a multiplicity of wedge-shaped spaces secured on the support member with the wedge-shaped spaces extending out in the direction of air flow, and coarse supporting means that impose little or no pressure drop secured to and confining the configuration of a substantial portion of the respective wedge-shaped spaces whereby adjacent spaces do not blow out to an extent sufficient to contact one another in a manner that otherwise would result in restriction of air flow through any of the spaces and a substantially even pressure gradient is maintained across all of the sides of all of the spaces to assure maximum utilization of the filtering surfaces of the fine small particle filter media and maintenance of steady, large volume diffuse air flow caused by suction of the room air through the large particle prefilter into the fan and discharge of the fan out through the relatively high velocity air discharge conduit means and the fine small particle filter to result in diffuse circulation and removal of a substantial portion of all particles usually found in room air.

12. A room air cleaner cartridge according to claim 11 wherein the fine small particle filter assembly is removably mounted on the mounting frame secured to the ends of the elongated supporting side members at a location defining the outlet from the relatively high velocity air discharge conduit means, and said means for sealing the small particle filter over the central opening in the mounting frame comprises a filter assembly gasket of a pliable sealing material seated between the mounting frame and the outer support member of the small particle filter assembly, and a plurality of flexible, resilient retaining finger means secured at different points around at least a portion of the periphery of the mounting frame and spaced from the filter assembly gasket a short distance to form a retaining grip for receiving the edges of the outer support member of the small particle filter assembly and for firmly clamping the small particle filter assembly in place over the filter assembly gasket and transversely across the open end of the high velocity air discharge conduit means.

13. A room air cleaner cartridge according to claim 12 further including a coarse wire-supporting structure secured within the inlet air passageway for supporting the coarse fiber large particle prefilter and an odor filter secured between the large particle prefilter and such coarse wire-supporting structure supplying the intake of the high volume fan whereby removal and replacement of the coarse large particle prefilter and odor filter after they have become dirty in service, is facilitated.

14. A room air cleaner cartridge according to claim 13 wherein said coarse fiber large particle prefilter and odor filter are fabricated as a composite unit with the coarse fiber prefilter surrounding the odor filter in a sandwich-like manner and being sealed around the peripheral edges thereof to form an integral structure and being comprised of two different grades of coarse filter fibers wherein one side of the sandwich-like structure is formed of one grade of coarse filter fiber and the remaining opposite side of the sandwich-like structure is formed of a finer grade of coarse filter fiber.

15. A room air cleaner employing the cartridge according to claim 14 further including an exterior cabinet of attractive appearance for housing the air cleaner cartridge with said exterior cabinet having air inlet and air outlet openings formed therein, and means for securing the air cleaner cartridge within said exterior cabinet with the air inlet and air outlet openings aligned with the inlet air passageway and the diffuse clean air discharge side of the small particle filter, respectively, without requiring the use of air tight seals between the exterior cabinet and the air cleaner cartridge.

* * * * *